United States Patent [19]

Iannucci

[11] 4,182,068

[45] Jan. 8, 1980

[54] CRAB TRAP BAIT CLAMP AND METHOD OF USING

[76] Inventor: Dorothy T. Iannucci, 3527 Nottingham La., Philadelphia, Pa. 19114

[21] Appl. No.: 828,702

[22] Filed: Aug. 29, 1977

[51] Int. Cl.² .................................................. A01K 69/10
[52] U.S. Cl. ..................................... 43/105; 248/505
[58] Field of Search .................. 43/41, 58, 100, 105; 248/499, 505, 510

[56] References Cited

U.S. PATENT DOCUMENTS

| | | | |
|---|---|---|---|
| 2,603,030 | 7/1952 | Pape | 43/100 UX |
| 3,237,905 | 3/1966 | Baker et al. | 248/510 |
| 3,290,743 | 12/1966 | Hanson | 248/505 X |
| 3,313,511 | 4/1967 | Koerner et al. | 248/499 |

Primary Examiner—James G. Smith
Attorney, Agent, or Firm—Seidel, Gonda, Goldhammer & Panitch

[57] ABSTRACT

A substantially flat flexible strip having a first end flanged downwardly for detachably securing the strip to a crab trap screen wire, a second tapered end at least a portion of which is flanged upwardly for detachably securing the strip to at least a second screen wire, and a roughened underside for gripping bait.

17 Claims, 3 Drawing Figures

CRAB TRAP BAIT CLAMP AND METHOD OF USING

BACKGROUND OF THE INVENTION

The present invention is directed to a bait clamp. In particular, the invention is directed to a bait clamp for holding bait stationary at the bottom of a crab trap.

The clamp is flexible and is shaped for easy mounting between the trap wires. One or more of the clamps may be used to accommodate varying sizes and quantities of bait.

Various bait-holding devices are known in the art. For example, see U.S. Pat. Nos. 1,862,187, 2,740,224 and 2,870,563. Such devices are intended for holding live bait. The devices are relatively intricate. None of them are suited for use in a crab trap.

Heretofore, crab traps having wired panels or screens have been used to ensnare a crab lured to the trap by bait placed in the trap. The bait was cut to the desired size and deposited on the bottom wire panel of the trap. The trap was then closed and lowered into the water. When the trap was lowered to the desired level, it was opened. Care had to be taken not to jostle the trap to prevent the bait from being separated from the trap. Unless the cross-section of the bait exceeded the spacing between the bottom panel wires, the bait could slip through the bottom panel. Haphazard attempts the bind the bait in place using string or the like have not been satisfactory.

An advantage of the invention is that it is extremely effective in holding bait in position on the bottom panel of the crab trap.

Another advantage of the invention is that it is relatively simple to attach to the bottom panel of the trap.

A further advantage of the invention is that it is relatively easy and inexpensive to manufacture.

Other advantages appear hereinafter.

BRIEF SUMMARY OF THE INVENTION

A clamp for holding biat stationary in a crab trap having a bottom wire panel or screen. The clamp is a substantially flexible strip of material having a first end for detachably securing the strip to one of the screen wires and a second end for detachably securing the strip to another screen wire. The underside of the clamp may be roughened to grip the bait.

DETAILED DESCRIPTION OF THE INVENTION

Figure 1:
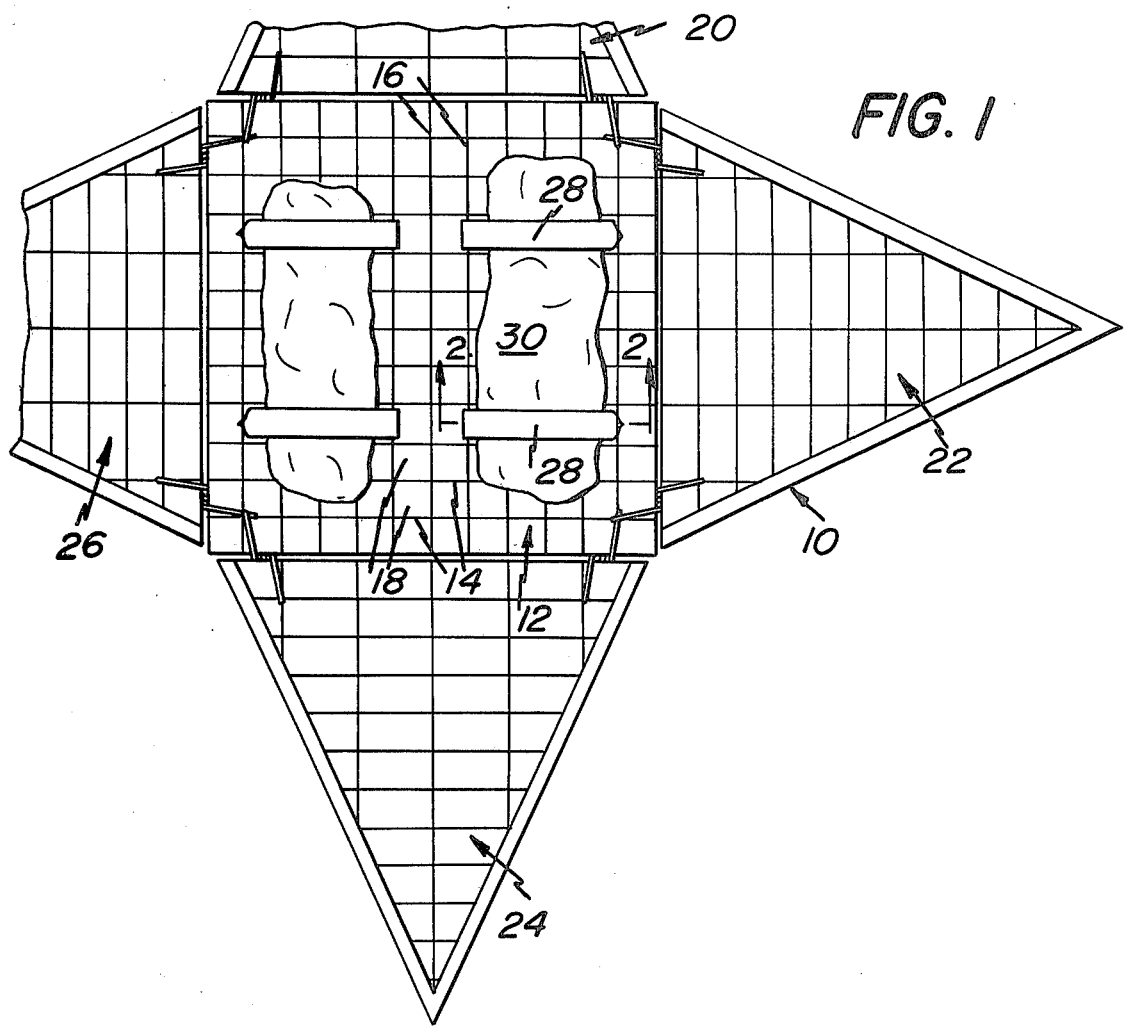
FIG. 1 is a plan view of an open crab trap with two strips of bait secured therein by the invention.

Referring to FIG. 1, wherein like numerals indicate like elements, there is shown a crab trap 10 having a square-shaped wire panel or screen 12 comprising a first set of wires 14 and a second set of wires 16 transverse thereto. The wires define a screen having equal sized openings 18.

The crab trap 10 includes four triangularly shaped wire panels or screens 20, 22, 24 and 26. Each of the triangular screens is pivotably secured to the bottom screen 12 by a pair of hinges, each of which may be a wound spring. Each of the triangular shaped screens is fastened to a rope which is drawn through a ring to pivot the screens upwardly. As the screens pivot upwardly, they close the trap. The crab trap 10 is well-known in the art and does not per se form the present invention.

Figure 2:
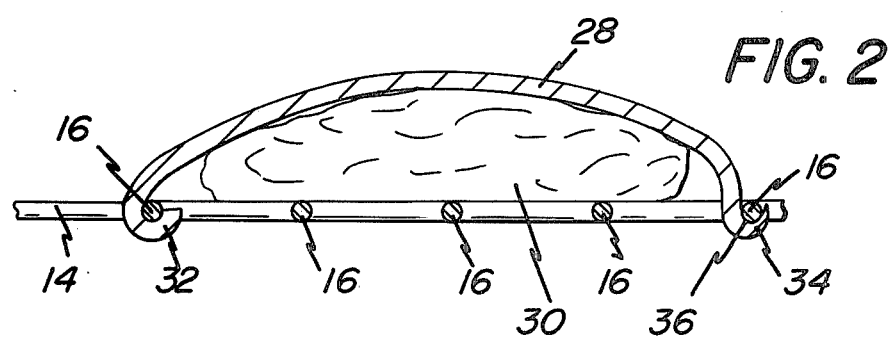
FIG. 2 is a cross-section taken along the lines 2—2 in FIG. 1.

The present invention is directed to a clamp 28 for securing a slice of bait 30 in position on the bottom screen 12 of the trap. See FIG. 2. The clamp 28 is made of a substantially flexible material such as high density polyethylene or other plastic polymeric material. The clamp could also be made of a flexible metal.

The clamp is provided with a first end 32 which is bent or flanged downwardly to grip one of the wires 16 by friction. The clamp is first secured to the wire and then pivoted to a raised position. The bait 30 is deposited on the screen 12 near the clamp 28. The clamp is then pivoted into contact with the bait. A second end 34 having a detent 36 is moved into position beneath another of the screen wires 16 to lock the clamp in place. The clamp flexes or bows slightly to accommodate the size of the bait 30. To remove the clamp 28, the second end 34 is depressed to release the wire 16 from detent 36. As a result, the clamp snaps back to its original shape. The first end 32 is then pushed downwardly to release the other wire 16.

The clamp 28 retains the bait 30 in position regardless of movement of the crab trap 10. If the bait 30 is relatively large, two or more clamps may be used to secure the bait in place. See FIG. 1. Moreover, several pieces of bait may be secured to the bottom screen 12 by means or two or more of the clamps.

Preferably, the second end 34 of the clamp is tapered in thickness and length to form a hook-like flange for attaching the clamp to the trap wire. The hook-like flange appears to simplify attachment of the clamp to the wire. The invention, however, is not limited to such a shape for the second end of the clamp. The second end of the clamp need only be shaped to detachably secure the clamp to one of the screen wires 16. It need not be tapered.

Figure 3:
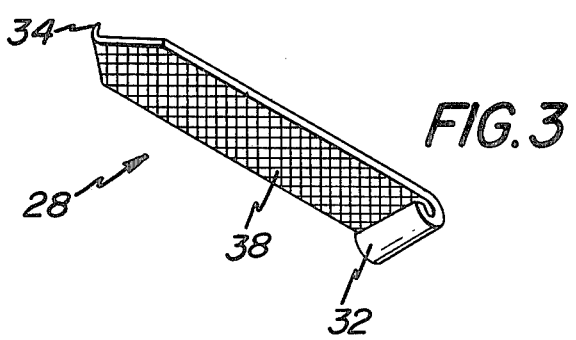
FIG. 3 is a view of the underside of the bait clamp.

It is also preferred that the underside 38 of the clamp be roughened to grip the surface of the bait 30. For example, the underside 38 may be serrated for this purpose. See FIG. 3.

An advantage of the invention is that it is extremely simple to attach to a crab trap. The invention securely clamps the bait in place on the bottom of the trap so that the trap can be opened at any time without jeopardizing the bait. The trap need not be lowered into position before it can be opened. Further, jostling the trap will not separate the bait from the trap. The invention also permits the same bait to be used on successive tries and minimizes loss of bait and the time and expense associated with re-baiting the trap.

The present invention may be embodied in other specific forms without departing from the spirit or essential attributes thereof and, accordingly, reference should be made to the appended claims, rather than to the foregoing specification as indicating the scope of the invention.

I claim:

1. In a crab trap having a bottom wire screen provided with plural spaced wires and a clamp for holding bait substantially stationary on said screen, the improvement comprising:

a flexible resilient strip provided with a substantially flat portion and first and second ends, said first end having a curved portion which curves away from said flat portion and towards said flat portion to define a slot for receiving at least one of said screen wires in pivotable rotation, said second end having a curved portion which curves away from said flat portion to frictionally engage another of said screen wires upon deformation of said strip.

2. The clamp according to claim 1 wherein said first and second ends are flanged oppositively.

3. The clamp according to claim 1 wherein said second end is tapered in thickness and length.

4. The clamp according to claim 1 wherein said strip has a roughened underside for gripping the bait.

5. The clamp according to claim 1 wherein said strip is a plastic polymeric material.

6. The clamp according to claim 1 wherein said strip is metal.

7. The clamp according to claim 1 wherein said strip is substantially flat.

8. In a crab trap having a bottom wire screen provided with plural spaced wires and a clamp for holding bait substantially stationary on said screen, the improvement comprising:

a flexible resilient strip provided with a substantially flat portion and first and second ends, said first end having a curved portion which extends downwardly away from said flat portion and upwardly back towards said flat portion to define a slot for detachably receiving at least one of said screen wires in pivotable relation, said second end having a curved portion which extends upwardly away from said flat portion to frictionally engage another of said screen wires upon deformation of said strip.

9. The clamp according to claim 8 wherein said second end is tapered in thickness and length.

10. The clamp according to claim 8 wherein said strip has a roughened underside for gripping the bait.

11. The clamp according to claim 8 wherein said strip is substantially flat.

12. The clamp according to claim 8 wherein said strip is a plastic polymeric material.

13. The clamp according to claim 8 wherein said strip is metal.

14. In a crab trap having a bottom wire screen provided with plural spaced wires and a clamp for holding bait substantially stationary on said screen, the improvement comprising:

a flexible strip provided with a substantially flat portion and first and second ends, said first end having a curved portion which extends downwardly below the underside of said flat portion and upwardly back towards the underside of said flat portion to define a slot for detachably receiving at least one of said screen wires in pivotable relation, said second end having a curved portion which extends upwardly away from said flat portion to frictionally engage another of said screen wires upon deformation of said strip, said underside of said strip being roughened to grip said bait.

15. The clamp according to claim 14 wherein said strip is a plastic polymeric material.

16. The clamp according to claim 14 wherein said strip is metal.

17. A method of holding bait substantially stationary in a crab trap having a bottom wire screen provided with plural spaced wires, comprising:

providing a flexible resilient strip having a substantially flat portion and first and second ends, said first end having a flanged portion and said second end having a flanged portion, pivotably securing said first end flanged portion to at least one of said screen wires, bending said strip over said bait, and latching said second end flanged portion on another of said screen wires.

* * * * *